United States Patent [19]
Engle

[11] 3,910,641
[45] Oct. 7, 1975

[54] BRAKE SYSTEM FOR AN ARTICULATED CARRIER

[75] Inventor: Thomas H. Engle, Cape Vincent, N.Y.

[73] Assignee: General Signal Corporation, Rochester, N.Y.

[22] Filed: June 28, 1974

[21] Appl. No.: 484,187

[52] U.S. Cl. .................................. 303/7; 303/29
[51] Int. Cl.² ........................................ B60T 13/26
[58] Field of Search ............ 188/3 H; 303/2, 6 R, 7, 303/9, 10, 13, 26, 29, 63

[56] References Cited
UNITED STATES PATENTS

| | | | |
|---|---|---|---|
| 2,411,406 | 11/1946 | Affleck | 303/29 UX |
| 2,831,733 | 4/1958 | Almond | 303/26 |
| 2,922,678 | 1/1960 | Schultz | 303/29 |
| 2,945,728 | 7/1960 | Stelzer | 188/3 H X |
| 2,955,882 | 10/1960 | Juhlin | 303/29 |
| 3,228,730 | 1/1966 | Schubert | 303/7 |

*Primary Examiner*—Duane A. Reger
*Attorney, Agent, or Firm*—Pollock, Philpitt and Vande Sande

[57] ABSTRACT

A brake system for a wheeled carrier which includes a plurality of separate sections flexibly joined into an articulated vehicle, the system including means for independently braking the various sections in the event of a failure of the joints therebetween, manually operable means for simultaneously actuating parking brakes in all sections and automatically operable means for actuating service brakes in all sections.

8 Claims, 4 Drawing Figures

——— HYDRAULIC LINES
——--— PNEUMATIC LINES

U.S. Patent   Oct. 7,1975   Sheet 1 of 3   3,910,641

— HYDRAULIC LINES
--- PNEUMATIC LINES

BRAKE SYSTEM FOR AN ARTICULATED CARRIER

CROSS REFERENCE TO RELATED APPLICATIONS

This application is related to the systems shown in co-pending U.S. applications Ser. Nos. 302,415 filed Oct. 31, 1972 by Thomas H. Engle; 393,529 filed Aug. 21, 1973 by Thomas H. Engle and 414,461 filed Nov. 10, 1973 by Thomas H. Engle, Glen L. Bohusch and Thomas M. Bogenschultz. The disclosures of these applications are hereby incorporated by reference.

BACKGROUND OF THE INVENTION

Recent years have seen the development of railway cars and roadway trailers which are of extended length relative to the cars and trailers known in the prior art. For example, in rail cars, the use of cars of well over 100 feet in length is not uncommon. In railroad applications, the use of longer cars can present difficulties in situations where the car approaches the maximum length which may travel over track sections having the minimum radii of curvature now in use. To account for this, articulated rail cars have been developed which may comprise from two to as many as five or more separate sections which are permanently, flexibly joined to each other. In some types of such cars, each section is independently supported on two single axle trucks at either end of the section, thus producing an articulated car which is intended for use as a large, single unit. Similar applications have been made in roadway trailers.

The development of such articulated carriers has presented unique problems regarding the type of braking system to be used. In conventional rail car brake systems, each individual car carries its own service, emergency and parking brake systems which are actuated by an air pressure line extending throughout the length of the train in the case of the service and emergency brake systems and by a hand wheel actuated hydraulic system located on each car in the case of the parking brake systems. One approach to a braking system for the newer articulated cars would be to provide a complete service, emergency and parking brake system for each section of the articulated car just as in previously known rail car brake systems. Such a solution has the obvious disadvantages that it would require a large amount of pressurized air for its operation and would increase the weight and expense of the articulated rail car. Such a system would have the advantage of insuring that each section of the car could be stopped should there be a failure of the flexible joints between sections.

Another disadvantage of such a system would be that the parking brake systems for each individual section would have to be actuated at the hand wheel located on each section. Usually, the parking brake for a particular rail car is designed to apply sufficient force to the brakes to stop and hold the weight of that car and its cargo. Thus, if the parking brake in only one section of an articulated car having a system such as described above were actuated, it very likely would not provide sufficient braking force to restrain the entire articulated car from movement. For example, if the articulated car were to run away following humping during routine assembly of a train, it would be difficult for yard personnel to actuate each independent parking brake system on each separate section of the car while the car is moving.

An object of this invention is to provide a brake system for an articulated carrier which includes a minimum amount of redundant brake equipment, while providing adequate service, emergency and parking brake capabilities.

A further object of this invention is to provide a parking brake system for an articulated carrier which may be actuated from a single location on the carrier.

Still another object of this invention is to provide a brake system for an articulated carrier which will insure that any section which breaks loose from the remainder of the carrier will be automatically, safely brought to a stop.

Another object of this invention is to provide a brake system for an articulated carrier which will be compatible with brake systems on conventional, prior art carriers.

One skilled in the art will realize that some or all of the above objects are realized by the brake system disclosed herein and may recognize other objects of this invention not specifically set forth; however, the scope of the invention is to be limited only by the claims presented hereafter.

SUMMARY OF THE INVENTION

To obtain these and other objectives, the brake system of the invention comprises in one of its embodiments a system adapted for use on a wheeled carrier having a plurality of separate sections which are flexibly joined into an articulated vehicle, each individual section including fluid pressure actuated brake means. A first fluid pressure conduit extends along each of the separate sections of the vehicle for conveying fluid pressure changes from a preceding carrier, through the articulated carrier, to following carriers, which other carriers may be of conventional design. The first fluid pressure conduit is connected to the conventional air pressure line of prior art braking systems. In railway applications, means such as a conventional ABD valve assembly are provided in one of the sections in the articulated carrier for producing a second fluid pressure in response to changes in the fluid pressure in the first pressure conduit. A second fluid pressure conduit conveys the second fluid pressure signals along each of the separate sections of the articulated carrier to first and second means for providing an actuating pressure for the pressure actuated brake means of the car. Means are provided in one the separate sections of the articulated carrier for automatically actuating one of the means for providing pressure to the brake means in the event of a loss of pressure in the first conduit. The brake system according to the invention may also include means operably connected to the first and second means for providing actuating pressure for the brake means, for automatically applying pressure to said brake means, independently of said ABD valve assembly.

In another embodiment, the invention comprises a brake system for an articulated carrier which includes a first fluid pressure conduit extending along each of the separate sections of the carrier for conveying fluid pressure changes from preceding carriers, through the articulated carrier, to following carriers, which other carries may be of conventional design. In railway applications, means, such as a conventional ABD valve assembly, are connected to the first conduit for producing a second fluid pressure. The second fluid pressure is directed to a means for providing actuating pressure for the pressure actuated brake means of the articulated carrier. Finally, a manually operable means located in one of the sections of the carrier and operably connected the means for providing actuating pressure is provided for independently applying pressure to the brake means.

BRIEF DESCRIPRTION OF THE DRAWINGS

DESCRIPTION OF THE PREFERRED EMBODIMENTS

Figure 1:
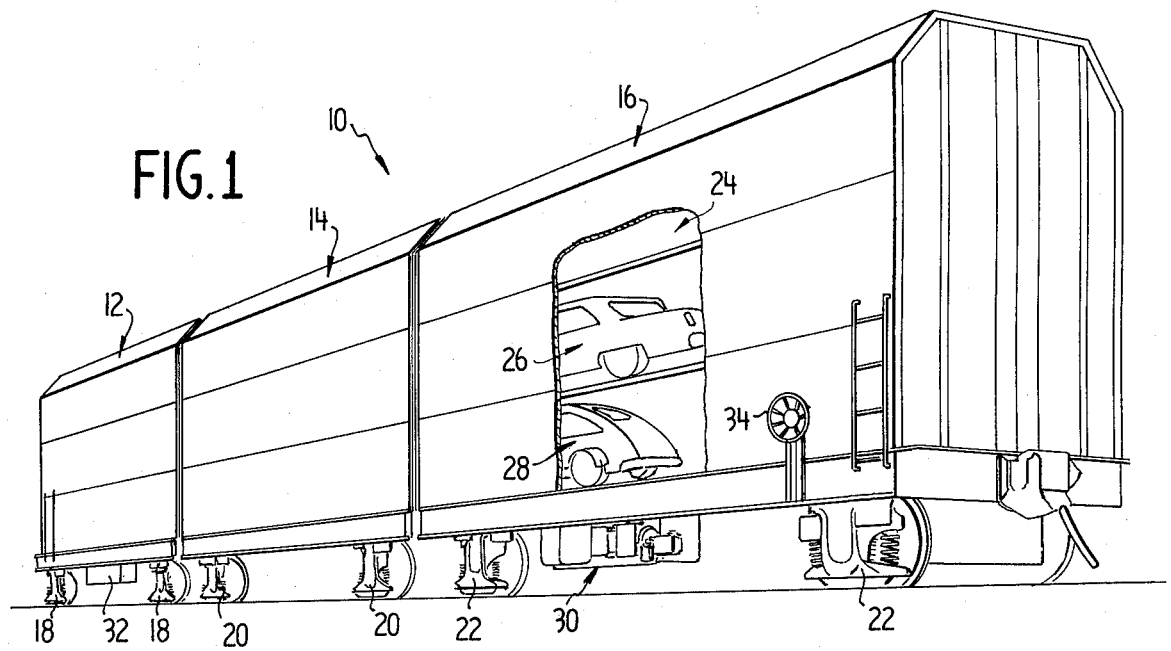
FIG. 1 shows a perspective view, partially broken away, of an articulated rail car of the type for which the brake system according to this invention is particularly suited.

There follows a detailed description of the preferred embodiments of the invention, reference being had to the drawings in which like reference numerals depict like elements of structure in each of the several Figures.

FIG. 1 shows a perpective view of an articulated rail car 10 which is made up of individual sections 12, 14, and 16. The individual sections 12, 14 and 16 are supported, respectively, on single axle end trucks 18, 20 and 22 and are joined by flexible joints therebetween (not shown). Section 16 is partially broken away to show the interior of the articulated rail car which may include a plurality of levels 24, 26 and 28 for receiving cargos such as automobiles. Located beneath section 16 is conventional ABD valve system 30. Located beneath section 12 is protection portion 32. A hand wheel 34 is located on section 16 for actuation of the parking brake portion of the brake system according to the invention (not shown in this view).

Although FIG. 1 shows an articulated rail car having three separate sections, it will be understood that the brake system according to the invention may be used with articulated cars having fewer or more sections than illustrated, without departing the spirit of this invention. Similarly, the location of conventional ABD valve system 30, protection portion 32 and parking brake system in the end sections of the articulated rail ccar is only by way of example since other locations for these components may be chosen by one skilled in the art without departing from the teachings of the invention.

Figure 2:
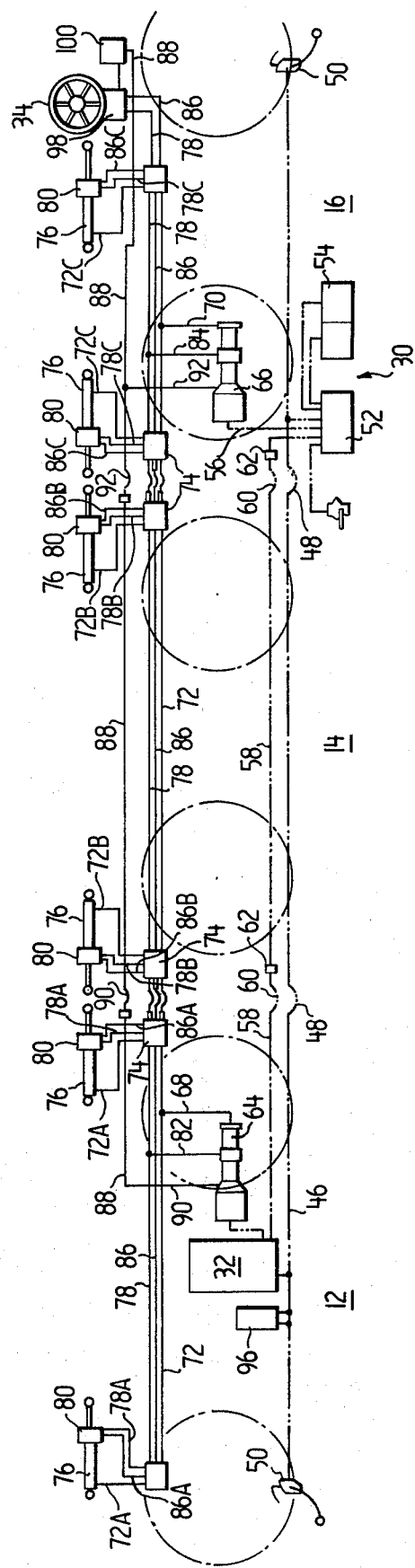
FIG. 2 shows a schematic diagram of a brake system according to the invention.

FIG. 2 shows a schematic diagram of the brake system according to the invention. An air pressure line 46 runs throughout the length of the articulated car and includes flexible couplings 48 between sections 12 and 14, and 14 and 16, as indicated. Couplings 48 are so designed that should sections of the articulated car become separated during use, the coupling will break and permit pressure line 46 to depressurize on either side of the break, for purposes to be discussed hereafter. Air pressure line 46 may be may be connected to the corresponding pressure lines of an adjacent rail car of conventional design via electro-pneumatic connector 50, such as that disclosed in application Ser. No. 414,461. In the illustrated embodiment, a standard ABD valve assembly 52, including the conventional two compartment air reservoir 54 for service and emergency brake applications is attached to section 16 of the articulated car in fluid communication with air pressure line 46. Pneumatic lines 56 and 58 extend from ABD valve assembly 52 as indicated. Line 58 runs from section 16 back through sections 14 and 12 and is joined between sections 16 and 14, and 14 and 12 by conventional flexible couplings 60 which, when broken, reseal line 58 on either side of the break to prevent depressurization. Lines 56 and 58 are connected, respectively, to pneumatic-to-hydraulic boosters 66 and 64, located in sections 16 and 12. A booster assembly suitable for use in this invention is disclosed in application Ser. No. 302,415. Boosters 64 and 66 include hydraulic output lines 68 and 70 which are connected to service brake line 72, as indicated. Service brake line 72 runs throughout the length of sections 12, 14 and 16 and is flexibly connected between sections 12 and 14, and 14 and 16 via connector blocks 74 which incorporate flexible couplings identical in function to couplings 60. Connector blocks 74 provide hydraulic communication from brake lines 72 to brake actuators 76 via lines 72A, 72B and 72C. car A parking brake actuation line 78 runs along the length of sections 12, 14 and 16 and is flexibly joined between sections 12 and 14, and 14 and 16 by connector blocks 74. Parking brake actuation line 78 is connected via blocks 74 to brake locking portion of mechanism 80 via lines 78A, 78B and 78C. Parking brake actuation lines 82 and 84 are connected from line 78 to the upstream end of the slack adjustment section of boosters 64 and 66 as shown in detail in FIG. 3. Hand brake deactuation line 86 runs along the length of cars 12, 14 and 16 and is flexibly joined between sections 12 and 14, and 14 and 16 by connector blocks 74. Line 86 is hydraulically connected to the brake unlocking portion of mechanism 80 by lines 86A, 86B and 86C. A hydraulic locking brake mechanism incorporating elements 76 and 80 is disclosed in applicant's U.S. Pat. No. 3,586,138 for Hydraulically Operated Lock Mechanism issued June 22, 1971. A hydraulic fluid reservoir or sump line 88 runs along the length of sections 12, 14 and 16 and is flexibly joined between sections 12 and 14, and 14 and 16 by connectors 90 and 92 which are identical to connectors 60.

Figure 3:
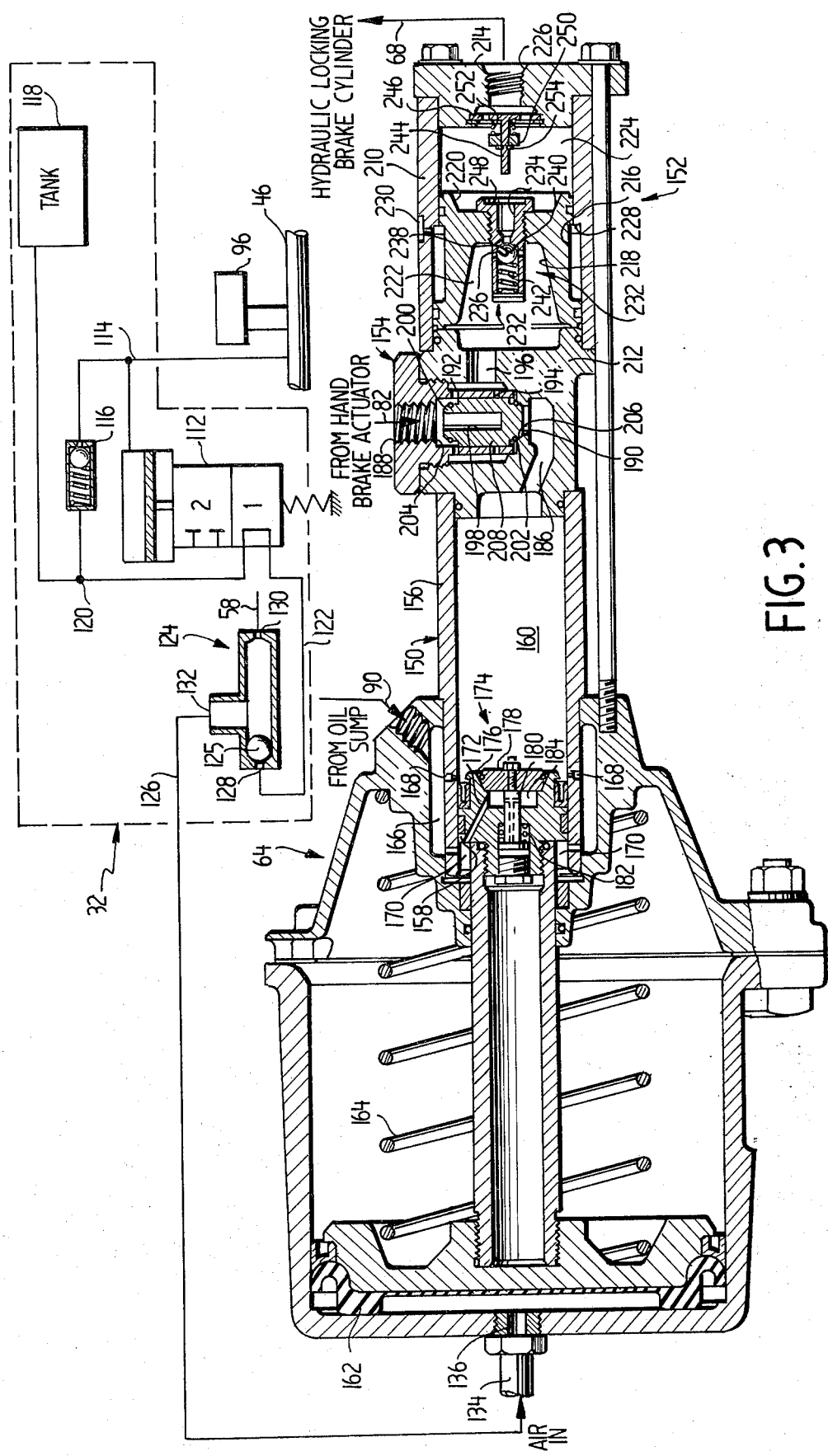
FIG. 3 shows a schematic diagram of a portion of the brake system shown in FIG. 2, particularly the protection portion.

Protection portion 32 is connected to air pressure line 46, and connector line 58 and to booster 64, as shown in detail in FIG. 3. A conventional pressure reduction relay valve 96 is connected to air pressure line 46. This valve has the function of accelerating the pressure reduction along the pressure line 46, which signals the need for a brake application. It is of the type commonly required in rail cars having over 75 feet of air pressure line in each car. A hydraulic parking brake actuator 98 is connected to lines 78 and 86 and to hydraulic fluid reservoir or sump 100 which, in turn, is connected to line 88, as indicated.

FIG. 3 shows the details of the protection portion 32 and its cooperation with booster 64. A conventional pilot-actuated, spring-biased, two-position valve 112 is connected to air pressure line 46 by branch line 114 which is connected to the pilot section of valve 112 as shown. Branch line 114 also is connected to check valve 116, which permits air to pass to protection reservoir or tank 118 via T-fitting 120 which directs the air flowing from check valve 116 to protection reservoir 118. When air pressure is present in line 46, valve 112 is caused to move from its unactuated position to its actuated position in which air flowing through branch line 114 is caused to accumulate in protection reservoir 118. In the event of a substantial loss of pressure in air pressure line 46 due, say, to the failure of the flexible joint 48 between sections 12 and 14 of the articulated car, valve 112 will return to position thus permitting the air accumulated in reservoir 118 to flow through valve 112 and to actuate two-way check valve 124. Valve 124 may be similar to that shown in applicant's application Ser. No. 393,529. As illustrated in FIG. 3, two way check valve 124 is in its normal position with fluid communication established between pressurized line 58 and booster 64.

When a depressurization of line 46 occurs due to a failure of couplings 48 and 60, valve 112 returns to position, thereby allowing pressure from reservoir 118 to force ball 125 to the right end of central passage way 126 and causing booster 64 to be actuated by the pressure of the air previously accumulated in reservoir 118. This results in an application of the brakes in section 12 of the articulated car; whereas, the same pressure reduction in pressure line 46 has caused ABD valve assembly 52 to actuate the brakes in sections 14 and 16. Thus, it can be seen that the protection system according to the invention will insure that the brake systems in all sections of the articulated car are actuated in the event of a break in air pressure line 46.

Continuing with respect to FIG. 3, the pneumatic-to-hydraulic boosters 64 and 66 of the invention are seen to comprise a pneumatic-to-hydraulic booster 150, slack adjuster 152 and double check valve 154 combined in the assembly 64. Booster 150 comprises a hydraulic pump including a cylinder 156 and a reciprocable piston 158 which cooperate to define a working space 160 provided with a passage 68 through which fluid is transferred to and from the brake actuators 76. Piston 158 is moved on its discharge stroke to displace oil from space 160 by an air motor 162 which responds to the output pressure of either control portion 32 or ABD valve 52 and is moved on its return stroke to the illustrated retracted position by a return spring 164. The maximum output pressure of the hydraulic pump equals the product of the pneumatic pressure supplied to motor 162 and the ratio of the effective area of the motor piston to the effective area of pump piston 158. Booster 150 is connected with the reservoir 100 of parking brake control unit 98 via conduit 90 and is provided with two parallel paths through which this conduit communicates with working space 160. The first path comprises passage 166, and a valve which is defined by pump piston 158 and by a port 168 formed in the wall of cylinder 156, which is open only when the piston is in, or very near, its retracted position. This path serves to maintain space 160, and the volumes connected with it, liquid-filled when the service brake is released, and also to allow escape of oil from the brake cylinders during shoe clearance-increasing operations. The second flow path comprises passage 166, the rod end space 170 of cylinder 156, and a passage 172 extending through piston 158 and containing a check valve 174 oriented to block flow from the working space.

This second path is effective to control the suction which booster 150 imposes on slack adjuster 152 and to insure return of piston 158 to its retracted position. Check valve 174 includes a seat 176 formed on piston 158, and a cooperating poppet head 178 which is fixed to a reciprocable stem 180 and is biased against the seat by a light coil compression spring 182. Oil is delivered to the check valve through the inclined passage 172 which interconnects the rod end cylinder space 170 with a chamber 184 formed in piston 158 adjacent the upstream end of seat 176. The head 180 has a valving surface comprising both a metal portion and a portion defined by an elastic O-ring. With this type of design, the pressure drop across the valve head must be kept relatively low in order to prevent lifting of the O-ring from its groove in the head; therefore, the angled passage 172 is so sized that it develops the major portion of the pressure differential required to open valve 174. This aspect of the design has a desirable side effect in that it affords to the designer a convenient way to control the degree of suction which the booster 150 applies to slack adjuster 152. Thus, in situations where it is desirable to use booster suction to augment the retraction forces acting on the brake actuators 76, the degree of such assistance can be increased or decreased easily merely reducing or increasing the diameter of passage 172.

Double check valve unit 154 serves selectively to connect slack adjuster 152 with hand brake control line 82 or booster transfer passage 186 depending which of these conduits is at the higher pressure. The valve unit comprises a body formed with a pair of conrol ports 188 and 190 which are connected, respectively, with control line branch 82 and passage 186, and a pair of system ports 192 and 194 which communicate with slack adjuster 152 via conduit 196. Mounted within the valve body is a reciprocable switching spool 198. The opposite ends of spool 198 are exposed to the pressures at the control ports 199 and 190, and each is provided with a valve head 200 or 202 which co-acts with one or the other of a pair of body seats 204 and 206 to control flow between the associated control port and the adjacent system port 192 or 194. The valving surface of each head includes a metal portion and an elastic O-ring which cooperate with the seat to prevent high and low pressure leakage, respectively. Spool 198 is formed with a central land 208 whose axial dimension is such that the land partially obstructs, and thus restricts, both of the system ports 192 and 194 when the spool is in the mid-position. The fact that both of the ports 192 and 194 are never closed completely insures that spool 198 will not stick in the mid-position, and the restrictions just noted prevent cross flow between the control ports 188 and 190 of a magnitude sufficient to impair the operation of one or the other of the brakes.

Slack adjuster unit 152 comprises a stepped cylinder 210 whose opposite ends are closed by cover plates 212 and 214 and which contains a differential area reciprocable piston 216 formed with large and small diameter portions 218 and 220 which fit the corresponding portions of the cylinder. Piston 216 divides cylinder 210 into a pair of working spaces 222 and 224; the space 222 at the larger diameter end of the cylinder being in continuous communication with the brake actuator 76 via port 226 and lines 68 and 70. The intermediate portion of the cylinder, which includes the region around step 228, is vented to atmosphere through a port 230. The two working spaces 222 and 224 normally are isolated from each other; but, under certain conditions, fluid can be transferred between the spaces through a cartridge type valve unit 232 which is threaded into an axial bore extending through piston 216. This valve unit comprises a transfer passage including axial and radial portions 234 and 236, respectively, which are separated by a seat 238 arranged to co-act with a spherical valve head 240. The valve head is urged toward seat 238 by the pressure in space 222 and by a coil compression spring 242, and is shifted in the opening direction by the pressure in space 224. Thus, the valve performs a relief function and allows flow from space 224 to space 222 when the pressure in the former exceeds the pressure in the latter by a predetermined amount. In a typcial case, spring 242 is selected to permit opening of the valve upon development of a differential pressure on the order of 12 p.s.i. Valve head 240 also can be unseated mechanically by a push rod 244 carried by a spider 246 fixed to cover 214. This actuation scheme is effective to open the valve just before piston 216 reaches the limit of its leftward travel (e.g. 1/16 inch before the piston abuts cover 214), and thereby permit flow from space 222 to space 224. The importance of these fluid transfer functions of valve unit 232 will be evident from the description of operation presented below. The stroke of piston 216, i.e., the axial distance between the limiting positions in which the piston abuts covers 212 and 214, respectively, determines the clearance between the brake shoes and the wheels.

When the system in FIGS. 2 and 3 is in service and both the handbrake and service brakes are released, the components assume their illustrated positions, and the spool 198 of valve unit 154 remains in the position which it assumed during the immediately preceding brake application. When a service brake application is initiated, ABD valve assembly 52 will deliver compressed air to boosters 64 and 66 at a pressure indicative of the desired braking effort, and air motor 162 will move pump piston 158 to the right on its discharge stroke. Initial movement of the piston isolates port 168 from working space 160, so for all practical purposes the oil displaced from the working space exits through passage 186. Since branch line 82 is vented to reservoir 100 while the hand brake is released, the oil delivered to passage 186 by the booster will shift spool 198 of double check valve 154 upwardly, thereby causing head 200 to engage seat 204 and isolate port 198 from port 194, and also causing head 202 to move away from seat 206 and open a flow path from port 190 to port 194. As a result, the oil displaced from booster 150 will pass through valve unit 154 and conduit 186 to the working space 222 of slack adjuster unit 152. As pressure develops in this space, piston 216 shifts to the right and displaces oil from working space 224 to the brake actuators 76. Therefore, the actuators 76 will extend and move to shoes into contact with the wheels. If shoe clearance is less than that which unit 152 is designed to maintain, the shoes will be moved into contact with the wheels before piston 216 reaches the limit of its rightward, movement, and possibly after the piston has moved only a slight distance from its initial position. Consequently, at this point, the pressure in working space 224 will rise above the pressure in space 222 as a result of the difference between the cross sectional areas of the piston portions 218 and 220. When the pressure differential reaches the setting of valv unit 232, spherical head 240 will unseat and permit flow from space 224 to space 222 through transfer passage 234, 236. As a result, piston 216 will be able to shift all the way to its limiting right hand position.

Just before piston 216 abuts cover 214, push rod 244 will engage valve head 240. Therefore, when the piston comes to rest, the valve head will be held open, and brake actuators 76 will be in direct communication with the working space 160 of booster 150. Because of this, oil can pass to the cylinders as may be necessary during the brake application, and the pressures therein will be maintained proportional to the pneumatic command pressure developed by ABD valve assembly 54.

When the service brake is released, the output pressure of the ABD valve assembly 54 is dissipated, so booster return spring 164 retracts piston 158 and thereby reduces the pressure in the working spaces 160 and 222 of booster 150 and slack adjuster 152, respectively. Accordingly, brake cylinder pressure, which prevails in space 224, is effective to shift piston 126 to the left to effect closure of valve 238, 240. Therefore, as booster piston 158 retracts and withdraws oil from working space 222, slack adjuster piston 216 shifts back toward its initial position and effects transfer of oil from the brake cylinders to working space 224. It should be noted that, when the brakes are applied, push rod 244 held spherical valve head 240 off seat 238, thus affecting an equalization of the pressures in working spaces 222 and 224. Because of the difference between the areas of piston portions 218 and 220, the balanced pressure condition will maintain piston 216 in its limiting left hand position. When the brakes are subsequently released, the pressure in space 222 must be reduced below the pressure in space 224 an amount sufficient to offset the differential between the area of piston portions 218 and 220 and overcome piston friction in order for the piston to begin to move back to its initial position. Since valve 238, 240 is open at the instant release is initiated, it follows that the required pressure differential is developed initially solely as a result of the flow of oil from space 224 through the valve. Normally, brake release is effected quickly enough that the rate of flow through valve 238, 240 is sufficient to develop the pressure differential needed to shift piston 216 and allow the valve to close. However, if the pressure in working space 222 is dissipated very slowly, the required pressure differential may not be developed, and consequently piston 216 can remain in the limiting right hand position. If this happens, all of the oil in the brake cylinders can escape to reservoir 100, and the brake actuators 76 will fully retract and destroy the slack compensation which unit 152 had previously effected. The stroke of booster piston 158 is sized on the assumption that slack compensation is afforded; therefore, during the next service brake application, the booster piston will bottom out (i.e., reach the end of its discharge stroke) before the existing shoe clearance has been taken up. As a result, the service brake will be ineffective for that application.

In order to eliminate loss of the service brake in the manner just described, the slack adjuster unit 152 of assembly 64 may include means for impeding the flow of oil through valve 238, 240 when the latter is being held open by push rod 244. This means takes the form of a check valve comprising a seat 248 which is carried by cartridge unit 232 and surrounds passage 234, and a cooperating head 250 which is mounted to slide along push rod 244. Head 250 is biased outward along the push rod by a coil compression spring 252 seated on spider 246, and its motion in that direction is limited by a snap ring 254 carried by the push rod. This ring is so located that, during movement of piston 216, check valve seat 248 will engage head 250 just before spherical head 240 engages the push rod. With this arrangement, check valve 248, 250 always will prevent flow from space 224 to space 222 whenever valve head 240 is held open by the push rod. As a result, the pressure differential required to shift position 216 back to the limiting left hand position always will be developed at the beginning of a brake release regardless of the rate of which the pressure in working space 222 is dissipated. The check valve 248, 250, of course, has no effect after piston 216 has moved far enough for snap ring 254 to separate head 250 from its seat, and therefore valve 238, 240 will be able to prevent stuck brakes in the manner described earlier. The functions of valve 248, 250 are more fully set forth in Ser. No. 302,415.

Movement of the booster piston 158 and slack adjustor piston 216 during brake release is effected by the combined actions of the suction created by the booster and the retraction forces exerted on the cylinders either by return springs, or, in the more usual case, by gravity forces acting on the shoes and their hangers. Assuming that shoe clearance at the commencement of the application was too small, the amount of oil expelled from working space 222 during movement of piston 216 necessarily will be greater than the quantity of oil displaced from booster working space 160 during the brake application; therefore, booster piston 158 will return to its retracted position before slack adjuster piston 216 reaches its limiting right hand position. This, however, does not prevent piston 216 from moving to that limiting position because full retraction of booster piston 158 effects reopening of port 168 and thereby allows the remaining oil to be displaced from working space 222 to escape to reservoir 100. As a result, the shoe clearance prevailing at the end of the brake release will be determined by the volumetric displacement of slack adjuster piston portion 216. Thus, cycling of the sevice brake under the assumed condition of too little shoe clearance causes unit 152 to increase clearance to the desired value.

In cases where the service brake is applied when shoe clearance initially is greater than desired, slack adjuster piston 216 will reach its right hand limit of motion before brake actuators 76 have brought the shoe into contact with the sheels. Therefore, in this case, there is no increase in the pressure in working space 224 during leftward movement of piston 216, and valve 238, 240 remains closed until just before the piston contacts cover 214. At that point, push rod 244 unseats valve head 240 so that the additional oil required to take up the remaining shoe clearance, and to develop the desired level of braking force, can be transferred to the brake cylinder circuit through passages 234 and 236. Since the brake application causes piston 216 to move full stroke into engagement with cover 214, it follows that subsequent release of the service brake will cause unit 152 to withdraw from brake actuator 76 exactly the same quantity of oil as in the case described earlier. Thus it follows that in situations where shoe clearance initially is too great, unit 152 reduces it to the desired value.

It should be observed that, when shoe clearance initially is too great the quanity of oil discharged from booster 150 during the application will necessarily be greater than the quantity returned to the booster when the brakes are subsequently released. Therefore, during the release, slack adjuster piston 216 will return to its initial position in contact with cover 212 before booster piston 158 reaches its retracted position. Under this condition, oil will be transferred from reservoir 100 to working space 160 through passage 172 and check valve 174, thereby insuring that piston 158 will return to its retracted position.

Figure 4:
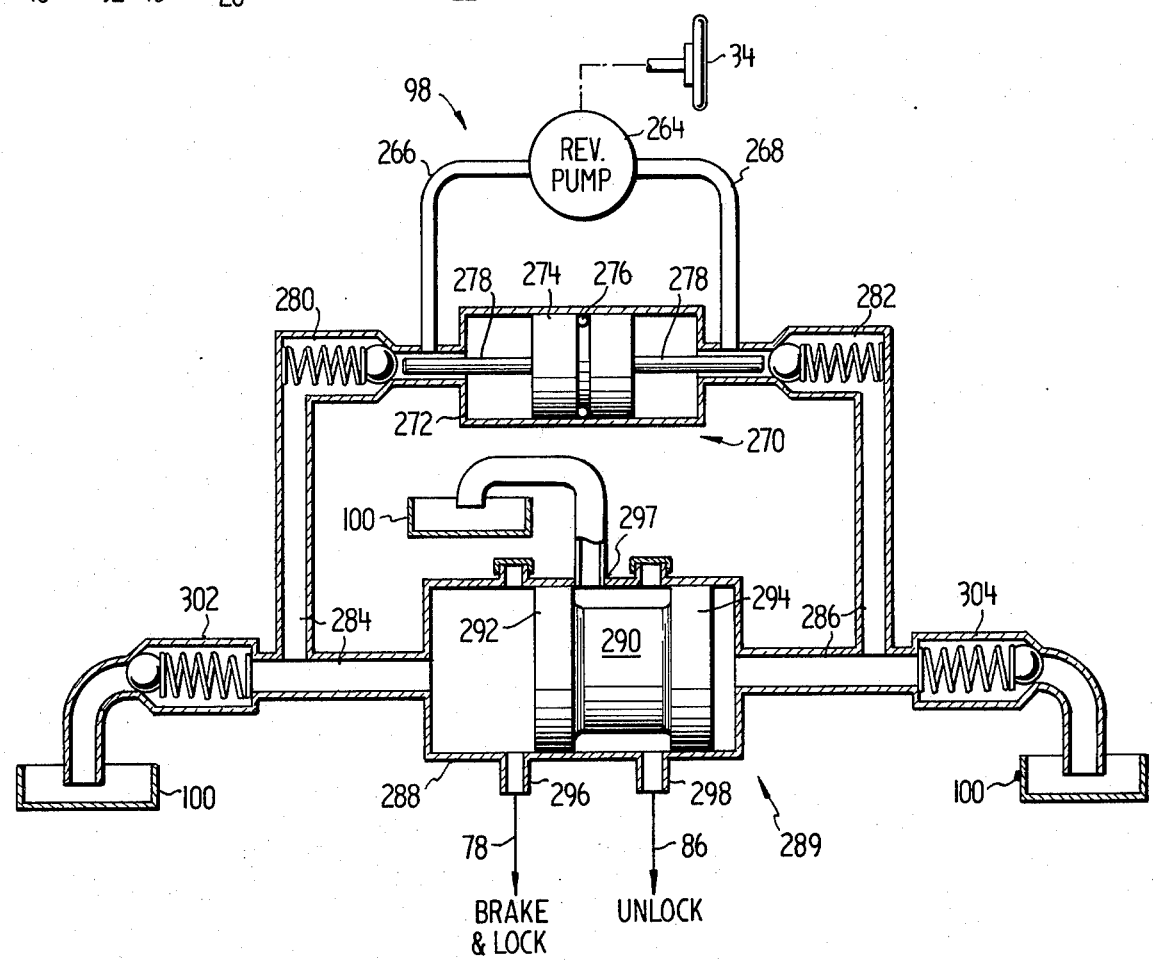
FIG. 4 shows a schematic diagram of a portion of the brake system shown in FIG. 2, particularly the parking brake actuating system.

Turning now to FIG. 4, the structural details and operation of hydraulic hand brake actuator 98 may be understood. The hand brake actuator comprises a reversible head pump 264 which is actuated by hand wheel 34 located on the exterior of one of the car sections, as indicted in FIG. 1. Branch lines 266 and 268 connect reversible hand pump 264 to a double-piloted check valve 270. Check valve 270 comprises a cylinder 272 in which a piston 274 is slidable received and sealed thereto by O-ring 276. Attached to the opposite faces of piston 274 are pilot rods 278 which extend axially from piston 274 a distance just short of check valves 280 and 282, when piston 274 is in the mid-position. Valves 280 and 282 are attached to the cylinder 272 just out-board of the point where branch lines 266 and 268 communicate with the opposite ends of piston 274. Branch lines 284 and 286 extend from check valves 280 and 282 as indicated. The structure comprising elements 264 through 286 may be a commercially procured product such as the hand pump manufactured by Hynautic, Inc., having part No. B-950044. It can be seen that branch lines 284 and 286 comprise combined inlet and outlet ports for pump 264 which may be selectively operated so as to pump fluid into branch line 284 and out of branch line 286 when pump 264 is operated in one direction and out of branch line 284 and into branch line 286 when pump 264 is operated in opposite direction.

Branch lines 284 and 286 are connected to the opposite ends of valve cylinder 288 of selector valve 289. A valve spool 290 is slidably received in valve cylinder 288 and includes lands 292 and 294 at either end thereof for sliding contact with cylinder 288. Port 296 provides communication between the left end of cylinder 288 and line 78 when spool 290 is in its right hand position. Port 298 provides communication between the right end of cylinder 288 and line 86, when spool 290 is in its left hand position. Port 297 provides communication from port 296 to reservoir 100 when spool 290 is in its left hand position and from port 298 to reservoir 100 when spool 290 is in its right hand position. Check valves 302 and 304 connect branch line 284 and 286 to reservoir 100 as indicated. In operation to actuate the parking brake, the crewmen will manipulate hand wheel 34 to cause pump 264 to discharge oil under pressure to line 266. As pressure develops in this line, piston 274 of unit 270 will shift to the right and rod 278 will open valve 282, permitting pump 264 to draw oil from reservoir 100 through check valve 304. Simultaneously, check valve 280 is lifted from its seat, permitting high pressure oil to flow into branch line 284. This causes check valve 302 to remain closed and moves spool 290 to the right, permitting oil to flow through port 296 to line 78 and to deliver fluid to the brake locking portion of units 80. Port 298 is also connected to reservoir 100 via port 297. A portion of the fluid pumped through line 78 by pump 264 is delivered to dobule check valve 154 via lines 82 and 84 and thence through slack adjusters 156 to brake actuators 76, exactly as in the case of a service brake application. Consequently, after the brake actuators 76 have set the brakes, the locks will be effective to hold them in that condition.

In order to release the parking brake application, the crewman will manipulate hand wheel 34 in the opposite direction and again actuate pump 264. Under this condition, the output of pump 264 is delivered through line 268, valve 284, port 298 and line 86 to the brake unlocking portion of units 80 of brake actuators 76 and line 78 is vented through port 296 and port 297 to reservoir 100. When the pressure in line 86 reaches the required level, the unlocking portions of units 80 will release the brake actuators 76 and allow their cylinders to retract under the action of the externalforces acting on them. As the brake actuators 76 retract, they displace oil to working space 224 and piston 216 shifts back to its initial position and displaces oil from working space 222 to reservoir 100 via conduit 196, double check valve unit 154, lines 82 and 84, line 78 and spool 290. The shoe clearance prevailing at the end of the release is determined by the displacement of piston portion 220, and thus will be exactly the same as after cycling of the service brake. Therefore, regardless of whether initial clearance is to small or to great, the final clearance will be the desired amount.

If the parking brake is applied while a service brake application is in effect, spool 198 of unit 154 will shift to the illustrated position and thereby connect lines 82 and 84 with the brake actuators 76, but little if any oil will be delivered to the cylinders because the brake are already applied. However, the pressure developed in control line 78 will cause the lock motors to actuate the cylinder locks. In the event the parking brake application is then released, the unlock portions of units 80 of brake actuators 76 will release the cylinder locks but brake cylinder pressure will not be released because spool 198 will shift its position and reconnect booster 150 with slack adjuster 152 as soon as control lines 82 and 84 are vented.

In a similar manner, if the service brake is applied while a parking brake application is in effect, spool 198 will shift its position and connect booster working space 160 with the brake actuators 76, but little if any oil will actuallybe delivered to the cylinders. When the service brake application is released, spool 198 may or may not shift back to its illustrated position, depending upon whether control lines 82 and 84 are still pressurized, but in no event will the release effect the condition of the cylinder locks. Moreover, since the booster in this case applies only very little oil to unit 152 during the service brake application, it follows that the release will effect transfer of little oil from unit 152 back to the booster regardless of whether or not spool 198 shifts.

Having described my invention in sufficient detail to enable one in the art make and use it, I claim:

1. A brake system for a wheeled carrier having a plurality of separate sections flexibly joined into an articulated vehicle, each section including fluid pressure actuatable brake means, comprising:

a first fluid pressure conduit extending along each of said separate sections for conveying first fluid pressure changes along said carrier, said first conduit being separably joined between said sections;

means connected to said first conduit and located in at least one of said sections of said carrier for producing second fluid pressures in response to changes in said first fluid pressure;

a second fluid pressure conduit extending along each of said separate sections for conveying said second fluid pressures along said carrier, said second conduit being separably, resealably joined between said sections;

first and second means connected to said second conduit and located in separate ones of said sections for providing actuating pressure for said brake means in said carrier in response to said second fluid pressures; and means located in at least one of said separate sections of said carrier for automatically actuating one of said means for providing actuating pressure for said brake means, in the event of a loss of pressure in said first conduit.

2. The brake system as defined in claim 1, further comprising manually operable means operatively connected to said first and second means for providing actuating pressure for said brake means, for independently applying pressure to said brake means.

3. The brake system as defined in claim 1, wherein said means for actuating one of said means for providing actuating pressure for said brake means comprises:

a two-way check valve having a pair of inlets and an outlet connected at one of said inlets to said second fluid pressure conduit, and at said outlet to said one means for providing actuating pressure for said brake means;

a reservoir connected for pressurization to said first conduit; and valve means for connecting said reservoir to the other of said inlets to said two-way check valve, in response to said loss of pressure.

4. The brake system as defined in claim 2, wherein the first and second means for providing actuating pressure for said brake means comprise:

an air motor responsive to said second fluid pressures;

a hydraulic cylinder having a reciprocable piston therein operatively connected to said air motor for reciprocation thereby;

a double check valve unit having a pair of inlets and an outlet operatively connected to said cylinder at one of said inlets to receive fluid displaced by said piston under the action of said air motor;

a hydraulic slack adjuster unit operatively connected to said outlet of said double check valve unit for conveying fluid displaced by said piston to said brake means for actuation thereof; and wherein said manually operable means comprises hydraulic pump means connected to said double check valve unit for applying pressure to the other of said inlets to said double check valve unit, thereby permitting independent actuation of said brake means.

5. The brake system as defined in claim 2, wherein the brake means of said carrier include brake locking and unlocking units and a brake actuation unit, and said manually operable means comprises:

reversible, manually operable pump means, having first and second combined inlet and outlet ports, for selectively pumping fluid into the first of said ports and out of the second during handbrake application and into of the second of said ports and out of the first of said ports during handbrake release;

a third fluid pressure conduit extending along each of said separate sections for conveying fluid from said pump means to and from said brake locking units and said means for providing actuating pressure for said brake means; said third conduit being separately joined between said sections;

a fourth fluid pressure conduit extending along each of said separate sections for conveying fluid from said pump means to and from said brake unlocking units said fourth conduit being separably joined between said sections, and selector valve means for connecting said second outlet port to said third conduit and said first inlet port to said fourth conduit hand brake application; and for connecting said first outlet port to said fourth conduit and aid second inlet port to said third conduit, during handbrake release.

6. A brake system for a wheeled carrier having a plurality of separate sections flexibly joined into an articulated vehicle in which each section includes fluid pressure actuatable brake means, comprising:

a first fluid pressure conduit extending along each of said separate sections for conveying first fluid pressure changes along said carrier, said first conduit being separably joined between said sections;

means connected to said first conduit and located in at least one of said sections of said carrier for producing second fluid pressures in response to changes in said first fluid pressure;

means, operatively connected to said means for producing second fluid pressures, for producing a third fluid pressure for actuating said brake means in said carrier sections in response to said second fluid pressures; and manually operable means, located in one of said sections and operatively connected to said means for providing a third fluid pressure, for independently applying actuating pressure to said brake means.

7. The brake system as defined in claim 6, wherein the means for providing actuating pressure for said brake means comprises:

an air motor responsive to said second fluid pressures;

a hydraulic cylinder having a reciprocable piston therein operatively connected to said air motor for reciprocation thereby;

a double check valve unit hving a pair of inlets and an outlet operatively connected to said cylinder at one of said inlets to receive fluid displaced by said piston under the action of said air motor;

a hydraulic slack adjustor unit operatively connected to said outlet of said double check valve unit for conveying fluid displaced by said piston to said brake means for actuation thereof; and wherein said manually operable means comprises hydraulic pump means connected to said double check valve unit for applying pressure to the other of said inlets of said double check valve unit, thereby permitting independent actuation for said brake means.

8. The brake system as defined in claim 6, wherein the brake means of said carrier include brake locking and unlocking units and a brake actuation unit, and said manually operable means comprises:

reversible manually operable pump means, having first and second combined inlet and outlet ports, for selectively pumping fluid into the first of said ports and out of the second during handbrake application and into of the second of said ports and out of the first of said ports during handbrake release;

a third fluid pressure conduit extending along each of said separate sections for conveying fluid from said pump means to and from said brake locking units and said means for providing actuating pressure for said brake means, said third conduit being separately joined between said sections;

a fourth fluid pressure conduit extending along each of said separate sections for conveying fluid from said pump means to and from said brake unlocking units, said fourth conduit being separably joined between said section; and selector valve means for connecting said second outlet port to said third conduit and said first inlet port to said fourth conduit during handbrake application; and for connecting said first outlet port to said fourth conduit and said second inlet port to said third conduit during handbrake release.

\* \* \* \* \*